US011256674B2

(12) United States Patent
Lauriston

(10) Patent No.: US 11,256,674 B2
(45) Date of Patent: Feb. 22, 2022

(54) COMPUTER IMPLEMENTED COLOR MANAGEMENT SYSTEM AND METHOD

(71) Applicant: Andrew Hugh Lauriston, London (GB)

(72) Inventor: Andrew Hugh Lauriston, London (GB)

( * ) Notice: Subject to any disclaimer, the term of this patent is extended or adjusted under 35 U.S.C. 154(b) by 78 days.

(21) Appl. No.: 16/509,855

(22) Filed: Jul. 12, 2019

(65) Prior Publication Data
US 2020/0019538 A1  Jan. 16, 2020

(30) Foreign Application Priority Data

Jul. 13, 2018 (GB) ..................................... 1811526

(51) Int. Cl.
*G06F 16/00* (2019.01)
*G06F 16/22* (2019.01)
(Continued)

(52) U.S. Cl.
CPC .............. *G06F 16/22* (2019.01); *G06F 9/451* (2018.02); *G06F 16/245* (2019.01); *G06F 16/248* (2019.01); *G06F 16/285* (2019.01)

(58) Field of Classification Search
CPC .. G06F 2111/10; G06F 2119/08; G06F 30/00; G06F 8/71; G06F 16/335; G06F 16/90328; G06F 3/0483; G06F 3/04847; G06F 3/0488; G06F 40/103; G06F 30/20; G06F 1/1616; G06F 1/1618; G06F 1/1641; G06F 1/1643; G06F 1/1652;
(Continued)

(56) References Cited

U.S. PATENT DOCUMENTS 5,509,111 A * 4/1996 Hong .................... G06T 11/001
  345/591
6,519,050 B1 * 2/2003 Eintracht ............. H04N 1/6033
  358/1.15
(Continued)

OTHER PUBLICATIONS

European Search Report in co-pending, related EP Application No. 19 18 6346, dated Nov. 29, 2019.

*Primary Examiner* — Shyue Jiunn Hwa
(74) *Attorney, Agent, or Firm* — Thomas | Horstemeyer, LLP

(57) ABSTRACT

A computer implemented color management system and method are disclosed. The system comprises a color data repository encoding data indexing links on items according to a predetermined color classification scheme and a processor configured to execute computer program code for executing a color management system, including computer program code configured to provide a user interface configured to receive a user query and provide data from the color data repository in dependence on the user query, computer program code configured to provide a plurality of content interfaces. Each content interface is configured to link a respective remote content data repository storing data on items to the item's respective entry in the color data repository and upon presentation of a new item by the respective remote content data repository to classify the new item according to the predetermined color classification scheme and index a link to the new item in the color data repository according to the classification.

17 Claims, 3 Drawing Sheets

(51) Int. Cl.
*G06F 9/451* (2018.01)
*G06F 16/245* (2019.01)
*G06F 16/28* (2019.01)
*G06F 16/248* (2019.01)

(58) Field of Classification Search
CPC .............. G06F 1/3218; G06F 1/3265; G06F 2203/04803; G06F 3/0416; G06F 3/04886; G06F 3/1446; G06F 15/00; G06F 11/1438; G06F 11/1441; G06F 16/00; G06F 16/22; G06F 16/245; G06F 16/26; G06F 3/04845
See application file for complete search history.

(56) References Cited

U.S. PATENT DOCUMENTS

| | | | |
|---|---|---|---|
| 6,594,386 B1 * | 7/2003 | Golshani | G06F 16/5838 382/166 |
| 10,460,475 B2 * | 10/2019 | Gershon | G06K 9/628 |
| 2013/0083999 A1 | 4/2013 | Bhardwaj | |
| 2013/0127892 A1 | 5/2013 | Moore et al. | |
| 2015/0186965 A1 | 7/2015 | Paul | |

* cited by examiner

COMPUTER IMPLEMENTED COLOR MANAGEMENT SYSTEM AND METHOD

CROSS-REFERENCE TO RELATED APPLICATION

This application claims priority to GB Patent Application No. 1811526.1 filed Jul. 13, 2018, the contents of which are incorporated by reference in its entirety as if set forth herein.

FIELD OF THE INVENTION

The present invention relates to a computer implemented color management system and method.

BACKGROUND TO THE INVENTION

Color matching is as much of an art as it is a science. The human retina contains three types of receptors which mostly respond to red, green and blue parts of the spectrum, respectively. However, it is not known how the human brain knows or learns how to classify something as "red" or one red different to another (or two red objects as being the same). While there have been many attempts to model the human visual and color processing system, the models and automated systems are typically inferior to a human "expert".

Nevertheless, it is desirable to classify colors and match them without subjectivity. A number of standards have been developed to ensure accurate color reproduction. In order to classify colors, a coordinate space is used for measured colors. For example, the CMYK system approximates colors to their closest Cyan (C), Magenta (M), Yellow (Y) and Black (K) pigments and works on the basis that two printers or display devices using the same proportions of pigments should produce approximately the same color.

Systems such as CMYK are, to a certain degree, limited in precision by the associated inks/devices used. A more uniform system is the pantone system which is a commonly used system for matching colors in printing and inks. A number of spot colors are standardized and each given a pantone number. Most of these cannot be simulated using CMYK as they are formed from proportions of 14 base pigments. Pantone color numbers are used to prescribe colors to be used in reproducing all manner of items including logos and other typographic material and flags.

The majority of these scales were originally designed for use by manual operators with reference to printed sample books. While such books are reasonably user friendly as they can be used to match colors by users with varying degrees of skill/precision, they also have disadvantages. For example, it is recommended that pantone sample books are replaced annually to take into account that the paper stocks will yellow over time, changing the appearance of the color of the inks printed on them.

CMYK and Pantone systems are primarily concerned with digital to output conversion (communicating the color of something digitally so that it can be printed with color accuracy).

Other systems are concerned with input to digital conversion such as RGB color spaces. These approach the issues from an image capture and display device perspective, for example RGB classifies colors to closest Red, Blue and Green values based on predetermined viewing conditions. As many imaging devices measure color via RGB sensitive pixels, an RGB representation of an image is often the default generated. While many sensors do not have an R, G and B pixel at each point in its array, the interpolated values are often considered accurate enough.

The RGB color space is defined with respect to a unit cube. The cube is drawn using three axes: red, green and blue. Each point inside the cube defines a unique color. Generally, RGB colors are specified in terms of the intensity of the respective R, G and B components at each pixel.

Other factors also come into account when describing colors—for example whether a color is reproduced using the same output device, whether an illuminant is the same etc.

sRGB is a standard proposed by Hewlett-Packard and Microsoft based on a calibrated calorimetric RGB color space with an assumed gamma value of 2.2 (so that the standard is in theory device independent as all devices should have the same gamma value and substantially the same color rendition).

Due to the subjective nature of categorization systems such as pantones (which require a degree of skill and judgement to determine which of various swatches in the book are closest to that being classified), measurement devices tend to produce results that can be expressed in a linear numeric scale such as CMYK, RGB etc.

As in many industries, competing standards have resulted in complexity and confusion. However, unlike in other industries where there has been convergence, in this area the various different systems seem to have consolidated and segmented the field depending on use—pantone typically being used for commercial printing, CMYK for smaller scale printers and RGB for digital communication and imaging.

STATEMENT OF INVENTION

According to an aspect of the present invention, there is provided a computer implemented color management system comprising:

a color data repository encoding data indexing links on items according to a predetermined color classification scheme;

a processor configured to execute computer program code for executing a color management system, including:
  computer program code configured to provide a user interface configured to receive a user query and provide data from the color data repository in dependence on the user query;
  computer program code configured to provide a plurality of content interfaces, wherein:
  each content interface is configured to link a respective remote content data repository storing data on items to the item's respective entry in the color data repository;
  each content interface is configured, upon presentation of a new item by the respective remote content data repository to classify the new item according to the predetermined color classification scheme and index a link to the new item in the color data repository according to the classification.

The computer implemented color management system may further comprise computer program code configured to receive color measurement data on an item and to index the item in the color data repository in dependence on the color measurement data.

The computer implemented color management system may further comprise computer program code configured to obtain the color measurement data from received encoded data.

The computer implemented color management system may further comprise computer program code configured to obtain an identifier for the measurement device or technique used to obtain the color measurement data and computer program code configured to adjust the color measurement data in dependence on predetermined data on the measurement device or technique.

The computer implemented color management system may further comprise computer program code configured to execute a bridge, the bridge being configured to receive a query on a color scheme different to the predetermined color scheme and is responsive to translate the query into the predetermined color scheme.

The computer implemented color management system may further comprise computer program code configured to translate a response to the query into the further color scheme.

At least one of the content interfaces may include an instance of the bridge to translate between a color scheme of the remote content data repository and the predetermined color classification scheme.

The remote content data repository may indexes items using a color classification scheme different to the predetermined color classification scheme, the bridge transparently translating data at the remote content data repository to the predetermined color classification scheme.

The computer implemented color management system may further comprise computer program code configured to record data and changes to data in the color data repository in a distributed ledger.

The computer implemented color management system may further comprise computer program code configured to record data in the color data repository on the source of a color classification for the item.

The computer implemented color management system may further comprise computer program code configured to record data on the reliability of the classification, the data on the reliability being obtained from predetermined data on the source of the color classification.

Each indexed link is preferably uniquely encoded in the color data repository, the color management system being configured, upon provision of the encoded link, to redirect to the item in the remote content data repository.

According to another aspect of the present invention, there is provided a computer implemented method for managing color data of items, comprising:
  encoding, in a color data repository, data indexing links on items according to a predetermined color classification scheme;
  receiving, via a user interface, a user query and providing data from the color data repository in dependence on the user query;
  providing a plurality of content interfaces, wherein:
  each content interface links a respective remote content data repository storing data on items to the item's respective entry in the color data repository; and,
  upon presentation of a new item by the respective remote content data repository classifies the new item according to the predetermined color classification scheme and indexes a link to the new item in the color data repository according to the classification.

The computer implemented method may further comprise receiving color measurement data on an item and indexing the item in the color data repository in dependence on the color measurement data.

The computer implemented method may further comprise obtaining the color measurement data from received encoded data.

The computer implemented method may further comprise obtaining an identifier for the measurement device or technique used to obtain the color measurement data and adjusting the color measurement data in dependence on predetermined data associated with the identifier.

The computer implemented method may further comprise receiving a query on a color of a color scheme different to the predetermined color scheme responding with a translation of the color in the predetermined color scheme.

The computer implemented method may further comprise recording data in the color data repository on the source of a color classification for the item.

The computer implemented method may further comprise recording data on the reliability of the classification, the data on the reliability being obtained from predetermined data on the source of the color classification.

Each indexed link is preferably uniquely encoded in the color data repository, the method further comprising, upon provision of the encoded link, redirecting to the item in the remote content data repository.

According to an aspect of the present invention, there is provided a color management system comprising a color data repository, a user interface and a plurality of content interfaces, wherein:
  each content interface is configured to link to a respective remote content data repository storing data on items;
  the color data repository indexing items from the remote content data repositories according to a predetermined color scheme; and,
  the user interface being configured to receive a user query and provide data from the color data repository in dependence on the user query.

Preferably, the color management system is arranged to receive color measurement data on an item and is configured to index the item in dependence on the color measurement data.

The color measurement data may be uniquely encoded. The unique encoding may encrypt or otherwise obfuscate the color measurement data, the color management data extracting, decrypting or otherwise decoding the color measurement data to index the item in the color scheme.

The encoded measurement data may be of the form set out in the applicant's co-pending patent application No. GB1619256.9 the content of which is herein incorporated by reference and discussed in more detail below.

In one embodiment, the index comprises a fractal coordinate for a fractal geometry modelled color space as described in the applicant's co-pending application (agent's ref JE/N35180-US), the content of which is herein incorporated by reference.

The encoding may also include an identifier for the measurement device or technique used to obtain the measurement data. It may also include date and/or other metadata.

The color management system preferably includes a bridge, the bridge being configured to receive a query on a color scheme different to the predetermined color scheme and is responsive to translate the query into the predetermined color scheme.

The bridge may be configured to translate a response to a query into the further color scheme.

The bridge may handle multiple different color schemes or be dedicated to translating between one and another. The bridge may also be integrated with the content interface to enable a remote site to transparently support a different color scheme.

The color data repository may include or comprise a distributed ledger such as a blockchain.

The color data repository may encode data on the source of a color classification for the item. The color data repository may encode data on the reliability of the classification.

Embodiments of the present invention concern a color management system and method in which color indexing and optionally classification is managed. Remote content repositories leverage the color indexing. Item colors can be queried and compared and queries can also be by color to identify items of a particular color (which can then be extended to items that have clashing/complimentary/matching colors).

Preferably, the color indexing is held in a distributed ledger in order that the index (and optionally the classification) is decentralized yet secure. The distributed ledger is preferably a private ledger but may be a public ledger.

The color indexing may include a link or other encoded (cryptographic or otherwise) reference to the item in the remote content data repository.

BRIEF DESCRIPTION OF THE DRAWINGS

Embodiments of the present invention will now be described by way of example only, with reference to the accompanying drawings in which.

DETAILED DESCRIPTION

Figure 1:
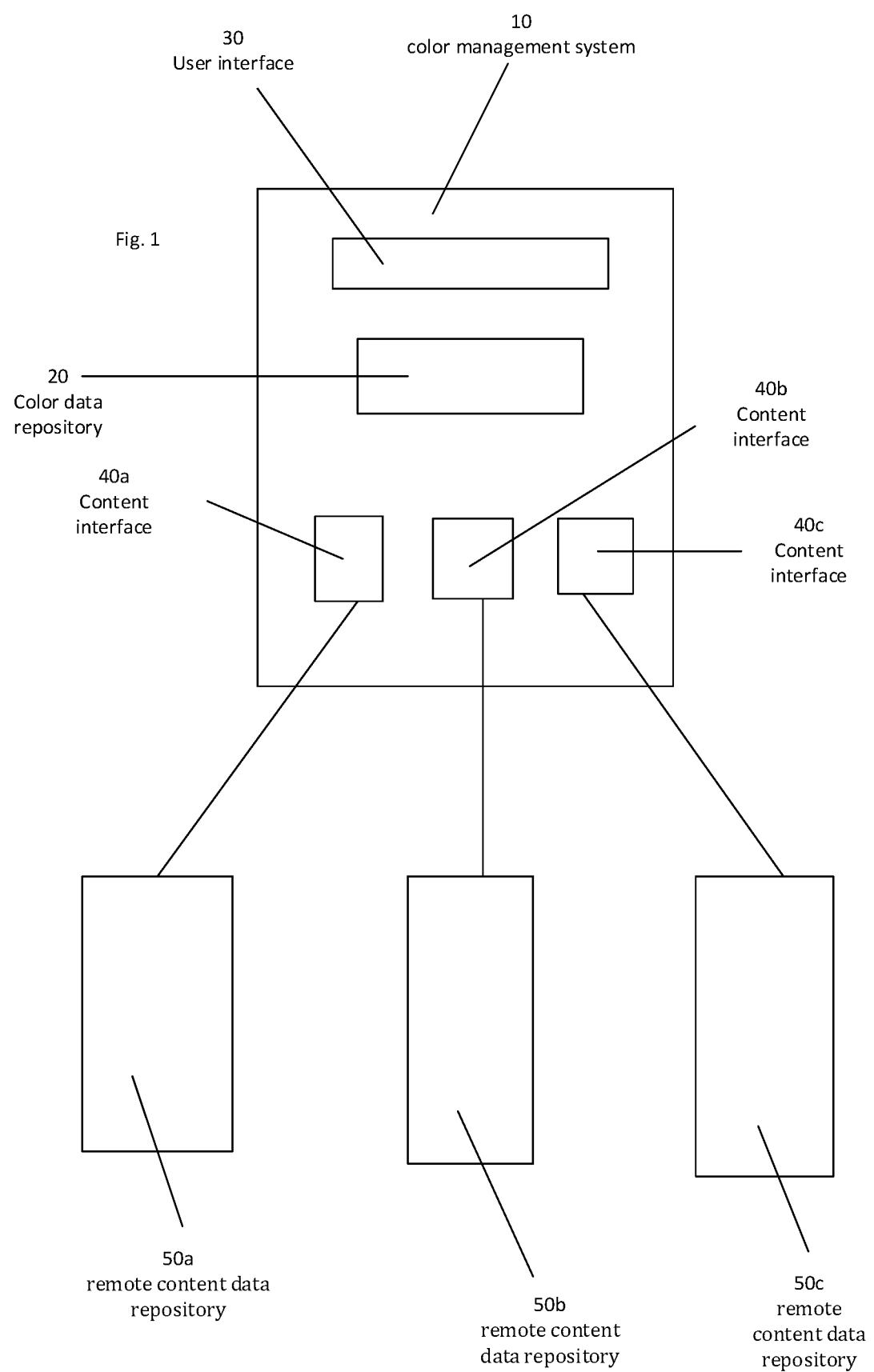
FIG. 1 is a schematic diagram of a color management system according to an embodiment of the present invention.

FIG. 1 is a schematic diagram of a color management system according to an embodiment of the present invention.

The color management system 10 includes a color data repository 20, a user interface 30 and a plurality of content interfaces 40a, 40b, 40c.

Each content interface 40a-c is configured to link to a respective remote content data repository 50a-c storing data on items.

The color data repository 20 indexes items from the remote content data repositories 50a-c according to a predetermined color scheme.

The user interface 30 is configured to receive a user query and provide data from the color data repository 20 in dependence on the user query.

The color data repository 20 may include data on the source of a color measurement for the item from which the item is indexed. The data may include predicted accuracy of the measurement. The predicted accuracy may come from prior knowledge of the source, the type of device used for color measurement, color scheme used to classify the item and its precision and/or compatibility with the predetermined color scheme or other factors. Predicted accuracy may be a multi-step calculation. For example, the device type used may have its own accuracy/tolerance (and this may differ depending on the colors measured as it may have a limited color gamut). This accuracy may then be combined with a factor associated with the color scheme—for example a color expressed as an 8 bit RGB provides significantly less granularity (256 different colors) than current pantones (which includes around 1800 colors in its recent solid Pantone colors range) but can express substantially fewer colors than a 16 bit RGB (around 65,000 different colors) assuming the device measuring those colors can of course differentiate to that level of granularity.

The user interface 30 may include a user tolerance parameter.

It will be appreciated that many user query types may be supported.

For example, where color data has previously been received for an item, the system 10 may provide a color scheme value when an identifier for the item is provided. The identifier could be a unique value previously assigned to the item by the color management system 10 when its color data was indexed, it may be a URL or other link to the item in the remote content data repository 50a-c or some other identifier linking the item to the indexed color record.

In another example, the system 10 may provide links to items having similar colors. In such an arrangement, "similar" may be determined by use of a metric such as the delta-E color difference (https://en.wikipedia.org/wiki/Color_difference).

Similarly, a user query may reference an item (that has a known measured color value) or a color value/measurement, asking the system 10 for same/similar colors or items of same/similar colors.

Other comparisons than "same" or "similar" could also be supported such as "complimentary", "contrasting" etc. Color field parameters may also be incorporated into queries to take into account differences in approaches taken by different industries, fields of use, nationalities, genders, age groups etc. For example, a fashion designer may view "complimentary" differently depending on intended demographic.

The tolerance parameter, if used, also preferably affects determination of similarity or other comparisons. For example, tolerance may define a degree of deviation that the user will accept while still considering values to be a valid comparison. The tolerance may also or alternatively define the degree of reliability the user will accept (which is determined from the measurement type accuracy discussed above).

It will be appreciated that indexing may be done on one or more of many different color schemes. In a preferred embodiment, the color scheme reflects a numeric or alphanumeric coding scheme that encodes each representable color value as a unique value in the coding scheme (so that the same shade of blue measured by two different devices is encoded to the same value)

For example, in the applicant's co-pending application referenced above, a color measurement device samples R, G and B values for each pixel to determine a wavelength value for a sample in Nanometers (NM). This is then encoded. It may be that the values across the sensor are averaged or some other similar processing performed to determine a color value according to a predetermined scale, code or scheme. Should there be significant divergence in color values (for example due to spots, stripes or multi-colors present), multiple values may be produced. Optionally, the sensor may be used to take a photograph of the element to maintain a record. Optionally, the record may be tagged or otherwise labelled with measured color values.

In one embodiment, the color scheme has a fractal geometry and colors in the color scheme are represented by fractal coordinates (dimension of the fractal and length along the fractal geometry at that dimension to the point). Further details of this arrangement can be found in the applicant's co-pending application (agent's ref JE/N35180-US), the content of which is incorporated by reference herein.

The scale, code or scheme may be numeric, alphanumeric or some other representation, although something that has minimal communication overhead and that can have a common meaning across all measurement devices is preferred. Preferably, the same sample, measured by two different measurement devices produces the same value from the scale, code or scheme (subject to measurement tolerances, positioning of the sample in the device etc.).

The value in the scale, code or scheme of a sample is preferably calculated mathematically in dependence on the measured properties.

The coded measurement and any ancillary data is then communicated to the color management system 10. This may be via a bridge as discussed below or in some embodiments there may be a direct write access to the color data repository 20 for certain systems (subject to security, authentication etc.).

In practice, a user would produce a color measurement (for example using a color measurement device described in the above co-pending application). Some link would typically be created to the item being measured—it may be recorded in a local (to the device or user's phone) or remote database or it may be that the link pre-exists (in a store or manufacturer's catalogue, database etc.). The color measurement and link is communicated to the color management system 10.

Once received, the color management system 10 indexes the color measurement—if the color measurement is measured using a scheme natively used for the index then no conversion may be needed. If conversion is needed then a bridge or similar may be employed as described below.

The link is then recorded in the data repository 20 against the indexed color value.

Using embodiments of the present invention, any device-sampled color can be matched with any other device-sampled color, irrespective of device type or sampling scheme. Color recognition and matching is also possible over the internet or in person, matching codes to other codes or codes to sampled colors.

Figure 2:
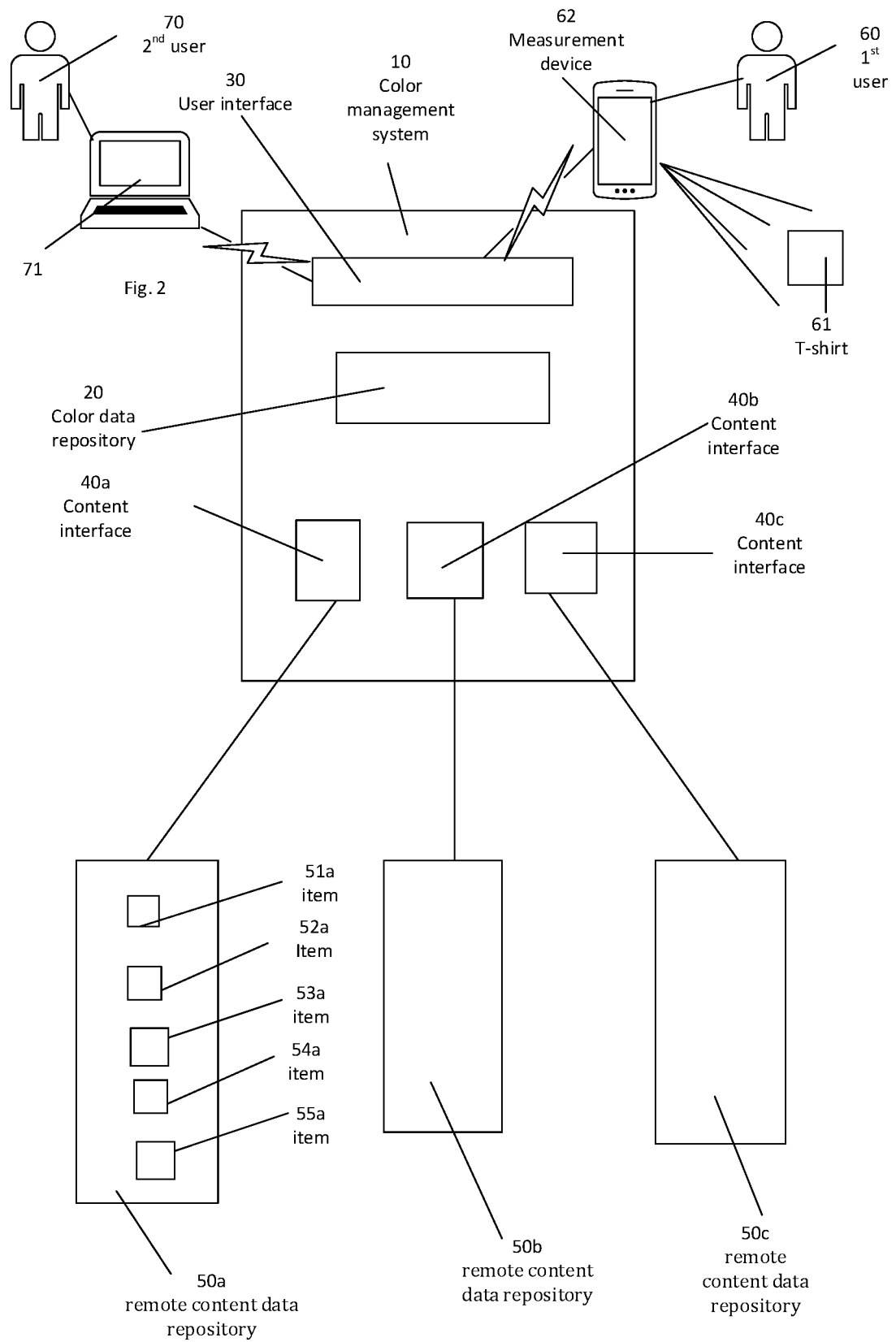
FIG. 2 is a schematic diagram of the color management system of FIG. 1 illustrating selected aspects in greater detail; and, FIG. 3 is a schematic diagram of a color management system according to another embodiment of the present invention.

FIG. 2 is a schematic diagram of the color management system of FIG. 1 illustrating selected aspects when the system is operating.

In this example, it is assumed that the data repository is populated with indexed color measurements for items and links to those items in remote data repositories.

For example, a first of the remote content data repositories 50a may be an e-commerce store listing items 51a-55a for sale.

A second of the remote content data repositories 50b may be a search engine listing, amongst others, items found on the first remote content data repository 50a. Both the first and second data repositories may have their data for the items linked to the color data repository 20 or it may be that the source (the e-commerce store 50a) stores the link and the search engine refers to this. In the case of a search, the search engine communicates via the interface 40b to retrieve links to results matching the query. Where those results are already known to it, the color data may be used to enrich its database.

A first user 60 may measure color of a t-shirt 61 in a shop using his measurement device 62 and send a query to the color management system 10 over the internet for matching items from the e-commerce store 50a.

The color management system 10 receives the query, extracts the color measurement (which it may at that time index in its data repository 20 against the t-shirt) and determines those colors from its data repository for the e-commerce store 50a that match the measurement (subject to any tolerance setting for the user/measurement device).

A second user 70 may find a dye or ink shade in a color chart (which may be physical, online or in an app), obtain a color code from the dye manufacturer (or dye packaging) and query the search engine for matching furnishings coordinating with the selected color. The search engine in turn relays the code to the color management system 10 requesting links to coordinating items. The index for the respective is searched in the data repository and its value in the color scheme is obtained. This value is then used to determine other entries in the data repository with similar color values which can then be referenced in their respective data sources to obtain further details on their respective products, dyes etc.

The results returned from the color data repository may be filtered to only be those of the search engine data repository 50a or may extend across the entire data repository 20. The color management system 10 preferably acts as a color matching service and other than providing color filtering of results, leaves the search engine to perform searching of appropriate items operations and presentation of results to the user.

While users are out shopping, their phone can be used to read matrix bar codes (or similar representations). If the matrix bar code is printed on the label of a purchasable item then the information it contains, the color of the object it is attached to, can be read.

The matching data on the phone is accessed to see if the scan matches any items in the user's 'My Home Colors' file. If a match is found the user can be alerted.

Mobile phones typically have cameras and no adaption to the phone is needed for it to read the matrix bar code.

In the case of color closeness matches, it will be appreciated that there are various ways of implementing this. For example, the color management system may identify the position of the reference color in the color scheme (color space) then use Delta E, % variance or some other approach to return links or other identifiers for items having "similar" colors. What is similar may be set by the requesting system, it may be a user parameter or some relative degree of similarity may be returned with results (so one color is reported as being more similar than another or more similar in red but less in green etc.).

Figure 3:
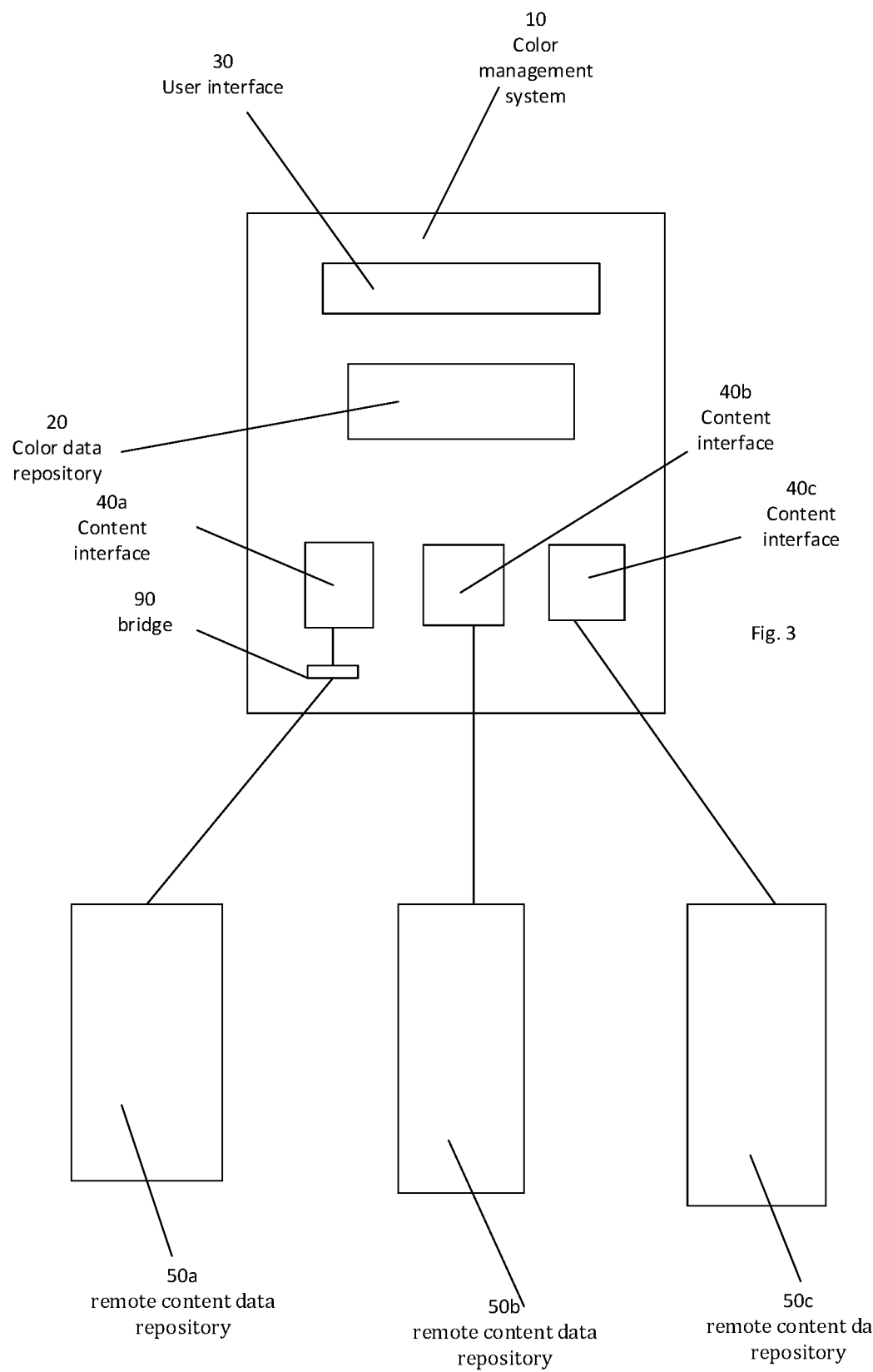

FIG. 3 is a schematic diagram of a color management system according to another embodiment of the present invention.

In some embodiments, different color schemes may be involved. For example, the predetermined color scheme may be RGB but one of the remote data repositories or other linked systems may refer to Pantone color scheme.

In the embodiment of FIG. 3, the color management system 10 includes a bridge 90. The bridge 90 is configured to receive a query on the further color scheme and is responsive to translate the query into the predetermined color scheme for accessing the color data repository 20.

The bridge 90 may also be configured to translate a response to a query into the further color scheme.

The bridge may handle multiple different color schemes or be dedicated to translating between one and another. The bridge may also be integrated with the content interface to enable a remote site to transparently support a different color scheme.

The bridge may operate by way of look-up tables, translating values in one color scheme to one natively supported by the color management system. As an alternative to a look-up table, conversion may take place mathematically or be performed by an artificial intelligence engine such as a neural network. Conversion may operate one-way (converting color measurements coming in to a suitable color space representation) or be bi-directional, converting outputs into a color space representation supported by the receiving system.

The color data repository may include or comprise a distributed ledger such as a blockchain.

In a blockchain, each indexed item is added to the blockchain for its respective indexed color value.

In one embodiment, the color scheme used by the color management system is an RGB cube such as the sRGB cube.

The visible part of the electromagnetic spectrum (colors) can be processed, irrespective of whether it can be perceived by the human visual system as the comparison and classification is being performed by electronic devices. Preferably, there is consistency in measurement conditions. Preferably, all colors are reflectance quantified. (Front lit) and all colors that are transparencies are also quantified. (Back lit).

In embodiments of the present invention, color charts can be replaced with an electronic paper display (EpD) screen to enable rendering of the coded colors into a viewable color.

In one embodiment, a user interface may be provided for interacting with the color management system. While many of the interactions may be with other systems (an e-commerce store classifying an item on its inventory, a search engine looking for color matches etc.), there will also be instances when a human user wishes to navigate the color space and the user interface provides an example mechanism for this.

Preferably, the color management system indexes colors that can then be searched/expressed via multiple parameters.

Of these parameters lay users will preferably be given 3 choices as on screen sliders or other user interface controls to select with:
1. Lighter or darker;
2. The first color and/or the second color;
3. % variance (or 'near to' match).

The user defines their choices for the search which is then assembled and becomes part of a code (in the same way as a code would have been generated if a measuring device was used).

Example: Violet as selected color, selection of biases can only be more Red or more Blue as well as lighter or darker. (Saturation is mostly perceived/seen as lighter or darker). Two on screen controls make these choices simple and effective. This search can then be communicated to the color management system identifying the code of the base color, acceptable error (% variance) and also lighter/darker.

The color management system identifies the position in the color scheme (color space) from the code of the base color and then returns HTML links or other mechanisms of identifying or reaching items in the data repository having colors in the color scheme that fall within the lighter/darker % variance.

Further applications for color choices are: contrasting; accenting; harmonizing; clashing; and toning. These will have similar on screen selections.

Other color schemes to the RGB cube can be used. For example, it may be a color space having fractal geometry as described above.

The user device may have a local (or remote) store of color measurements or preferences so as to record wardrobe content, home wall colors etc. Similar features may be provided per-projects for professional users etc.

For more sophisticated users such as professionals and businesses, control over of all (or more) of the parameters may be enabled. The scales of the parameters may also be displayed for user information. Parts of the data may also be expressed graphically depending on the needs and preferences of users.

Parameters may include: Reflectance; Transparency/translucence; Red; Green; Blue; White; Black; Saturation; variance matching as more or less than 1.00.

Color data may be expressed in Red, Green and Blue forms (R, G, B,) with conversions to Cyan, Magenta, Yellow, K/Black forms (C, M, Y, K). Data may also be available for other program to use such as exporting to common file formats.

It is to be appreciated that certain embodiments of the invention as discussed above may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is indicated by the recitations in the statement of invention and equivalents thereof.

The invention claimed is:

1. A computer implemented color management system comprising:
 a color data repository encoding data indexing links on items according to a predetermined color classification scheme, the data repository including an entry for each item comprising a link to the item in a remote data repository indexed according to the color classification;
 a processor configured to execute computer program code for executing a color management system, including:
 computer program code configured to provide a user interface configured to receive a user query on an item or on color data and provide data from the color data repository in dependence on the user query;
 computer program code configured to provide a plurality of content interfaces, wherein:
 each content interface is configured to link a respective remote content data repository storing data on items to the item's respective entry in the color data repository;
 each content interface is configured, upon presentation of a new item by the respective remote content data repository to classify the new item according to the predetermined color classification scheme and index a link to the new item in the color data repository according to the classification, wherein at least one of the content interfaces includes an instance of a bridge to translate between a color scheme of the remote content data repository and the predetermined color classification scheme, the color scheme of the remote content data repository being different to the predetermined color classification scheme; and computer program code configured to record data on the reliability of the classification, the data on the reliability being obtained from predetermined data on the source of the color classification, the user interface including a tolerance input defining the degree of reliability of color match to a color or item specified in the user query that the user will accept, the system being configured to apply said data on the reliability of the classification to the color classification and provide data from the color data repository in dependence matching within said tolerance.

2. The computer implemented color management system of claim 1, further comprising computer program code configured to receive color measurement data on an item and to index the item in the color data repository in dependence on the color measurement data.

3. The computer implemented color management system of claim 2, further comprising computer program code configured to obtain the color measurement data from received encoded data.

4. The computer implemented color management system of claim 3, further comprising computer program code configured to obtain an identifier for the measurement device or technique used to obtain the color measurement data and computer program code configured to adjust the color measurement data in dependence on predetermined data on the measurement device or technique.

5. The computer implemented color management system of claim 1, further comprising computer program code configured to execute a bridge, the bridge being configured to receive a query on a color scheme different to the predetermined color scheme and is responsive to translate the query into the predetermined color scheme.

6. The computer implemented color management system of claim 5, further comprising computer program code configured to translate a response to the query into the further color scheme.

7. The computer implemented color management system of claim 1, wherein the remote content data repository indexes items using a color classification scheme different to the predetermined color classification scheme, the bridge transparently translating data at the remote content data repository to the predetermined color classification scheme.

8. The computer implemented color management system of claim 1, further comprising computer program code configured to record data and changes to data in the color data repository in a distributed ledger.

9. The computer implemented color management system of claim 1, further comprising computer program code configured to record data in the color data repository on the source of a color classification for the item.

10. The computer implemented color management system of claim 1, wherein each indexed link is uniquely encoded in the color data repository, the color management system being configured, upon provision of the encoded link, to redirect to the item in the remote content data repository.

11. A computer implemented method for managing color data of items, comprising:

encoding, in a color data repository, data indexing links on items according to a predetermined color classification scheme, the data repository including an entry for each item comprising a link to the item in a remote data repository indexed according to the color classification;

receiving, via a user interface, a user query on an item or on a color and providing data from the color data repository in dependence on the user query;

providing a plurality of content interfaces, wherein:

each content interface links a respective remote content data repository storing data on items to the item's respective entry in the color data repository;

upon presentation of a new item by the respective remote content data repository classifies the new item according to the predetermined color classification scheme and indexes a link to the new item in the color data repository according to the classification, wherein at least one of the content interfaces includes an instance of a bridge to translate between a color scheme of the remote content data repository and the predetermined color classification scheme, the color scheme of the remote content data repository being different to the predetermined color classification scheme; and recording data on the reliability of the classification, the data on the reliability being obtained from predetermined data on the source of the color classification, the computer implemented method further comprising receiving a tolerance input defining the degree of reliability of color match to a color or item specified in the user query that the user will accept, applying said data on the reliability of the classification to the color classification and providing data from the color data repository in dependence matching within said tolerance.

12. The computer implemented method of claim 11, further comprising receiving color measurement data on an item and indexing the item in the color data repository in dependence on the color measurement data.

13. The computer implemented method of claim 12, further comprising obtaining the color measurement data from received encoded data.

14. The computer implemented method of claim 13, further comprising obtaining an identifier for the measurement device or technique used to obtain the color measurement data and adjusting the color measurement data in dependence on predetermined data associated with the identifier.

15. The computer implemented method of claim 11, further comprising receiving a query on a color of a color scheme different to the predetermined color scheme responding with a translation of the color in the predetermined color scheme.

16. The computer implemented method of claim 11, further comprising recording data in the color data repository on the source of a color classification for the item.

17. The computer implemented method of claim 11, wherein each indexed link is uniquely encoded in the color data repository, the method further comprising, upon provision of the encoded link, redirecting to the item in the remote content data repository.

* * * * *